(12) United States Patent
Matsumaru

(10) Patent No.: US 9,630,253 B2
(45) Date of Patent: Apr. 25, 2017

(54) POLYGON MACHINING DEVICE AND POLYGON MACHINING METHOD

(71) Applicants: CITIZEN HOLDINGS CO., LTD., Tokyo (JP); CITIZEN MACHINERY CO., LTD., Nagano (JP)

(72) Inventor: Hajime Matsumaru, Saitama (JP)

(73) Assignees: CITIZEN WATCH CO., LTD., Tokyo (JP); CITIZEN MACHINERY CO., LTD., Nagano (JP)

(*) Notice: Subject to any disclaimer, the term of this patent is extended or adjusted under 35 U.S.C. 154(b) by 0 days.

(21) Appl. No.: 14/779,317

(22) PCT Filed: Mar. 14, 2014

(86) PCT No.: PCT/JP2014/056916
§ 371 (c)(1),
(2) Date: Sep. 22, 2015

(87) PCT Pub. No.: WO2014/156729
PCT Pub. Date: Oct. 2, 2014

(65) Prior Publication Data
US 2016/0039009 A1 Feb. 11, 2016

(30) Foreign Application Priority Data
Mar. 28, 2013 (JP) .................. 2013-069238

(51) Int. Cl.
*B23B 5/00* (2006.01)
*B23B 5/36* (2006.01)
(Continued)

(52) U.S. Cl.
CPC .............. *B23B 5/36* (2013.01); *B23Q 27/00* (2013.01); *B23Q 27/006* (2013.01);
(Continued)

(58) Field of Classification Search
CPC .......... G05B 19/39; G05B 19/00; B23B 5/36; B23B 2265/32
See application file for complete search history.

(56) References Cited

U.S. PATENT DOCUMENTS 4,092,720 A * 5/1978 Carey ................. G05B 19/195
700/181
4,313,260 A * 2/1982 Yeo ......................... B23P 19/04
29/33 J
(Continued)

FOREIGN PATENT DOCUMENTS

JP    S56-147022 U    11/1981
JP    S59-188103 U    12/1984
(Continued)

OTHER PUBLICATIONS

Written Opinion of the International Searching Authority for PCT/JP2014/056916, Apr. 22, 2014.
(Continued)

*Primary Examiner* — Will Fridie, Jr.

(57) ABSTRACT

A polygon machining method whereby first polygon machining is carried out on a workpiece held by a main axis, by using a polygon cutter attached to a tool main axis, then machining using a tool other than the polygon cutter is carried out, and second polygon machining after said machining is carried out, using the polygon cutter. The polygon machining method comprises: a synchronized stopping step in which the main axis is stopped at a predetermined prescribed rotation position, in a state in which the main and the tool main axis during polygon machining are synchronously rotated when the first polygon machining has been completed; a synchronization release step in which the synchronization of the main axis and the tool main axis is released when starting machining after the first polygon machining; a main axis stopping step in which the main axis (Continued)

is stopped at a prescribed rotation position when the machining after first polygon machining has been completed; and a synchronization starting step in which the main axis and the tool main axis are synchronously rotated when starting second polygon machining.

2 Claims, 5 Drawing Sheets

(51) Int. Cl.
   *B23Q 27/00* (2006.01)
   *G05B 19/4093* (2006.01)
(52) U.S. Cl.
   CPC ......... *G05B 19/40931* (2013.01); *G05B 2219/45236* (2013.01); *Y10T 82/10* (2015.01)

(56) References Cited

U.S. PATENT DOCUMENTS

| | | | | |
|---|---|---|---|---|
| 4,364,110 A | * | 12/1982 | Hyatt | B60R 16/0373 700/180 |
| 4,402,202 A | * | 9/1983 | Gombas | B21D 51/263 72/124 |
| 4,413,539 A | * | 11/1983 | Ishizuka | B23B 3/06 29/36 |
| 4,692,071 A | * | 9/1987 | Hirota | B23G 1/20 318/39 |
| 4,862,379 A | * | 8/1989 | Fujimoto | G05B 19/414 700/169 |
| 5,022,293 A | * | 6/1991 | Farkas | B23Q 1/5481 82/1.11 |
| 5,355,062 A | * | 10/1994 | Takizawa | B65G 43/08 318/568.1 |
| 6,175,439 B1 | * | 1/2001 | Ozaki | G02B 26/121 359/196.1 |
| 6,438,446 B1 | * | 8/2002 | Trachier | G05B 19/416 408/11 |
| 2005/0262976 A1 | | 12/2005 | Shibui | |
| 2008/0239432 A1 | | 10/2008 | Itami | |
| 2009/0005910 A1 | * | 1/2009 | Akita | B23P 19/066 700/275 |
| 2015/0036144 A1 | * | 2/2015 | Shimizu | G01D 5/3473 356/450 |
| 2016/0116907 A1 | * | 4/2016 | Makino | G05B 19/416 700/188 |

FOREIGN PATENT DOCUMENTS

| | | |
|---|---|---|
| JP | H01-293313 A | 11/1989 |
| JP | H05-169301 A | 7/1993 |
| JP | 2001-228432 A | 8/2001 |
| JP | 2004-074360 A | 3/2004 |
| JP | 2008-070658 A | 3/2008 |
| JP | 2011-161542 A | 8/2011 |
| JP | 5080120 B2 | 11/2012 |

OTHER PUBLICATIONS

International Search Report for PCT/JP2014/056916, Apr. 22, 2014.
Japan Patent Office, Office Action for Japanese patent application No. 2013-069238, Jul. 12, 2016.

\* cited by examiner

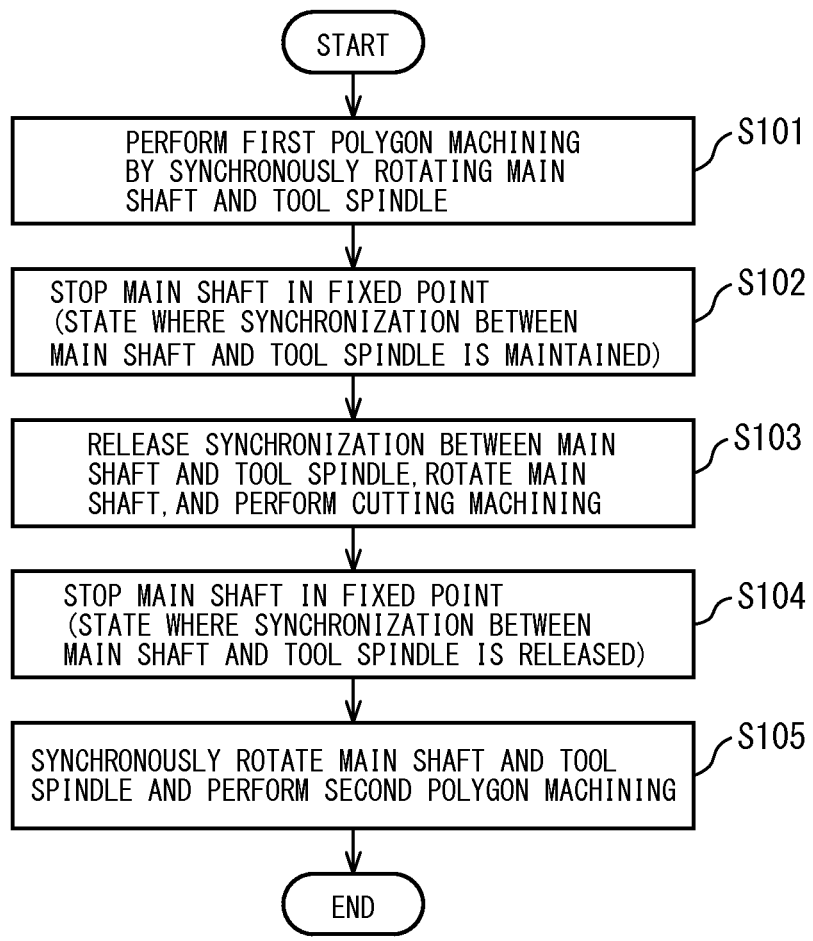

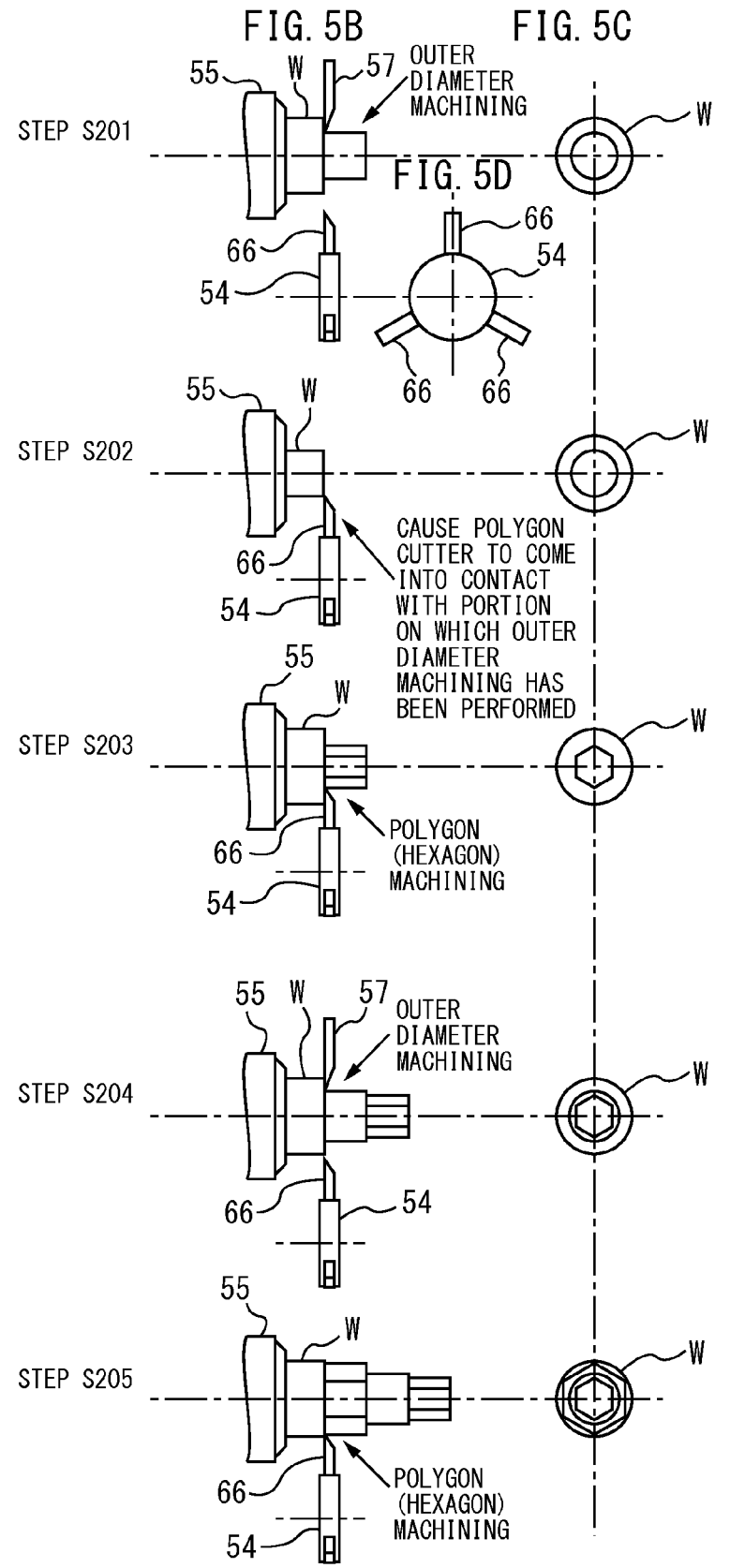

POLYGON MACHINING DEVICE AND POLYGON MACHINING METHOD

FIELD

The present invention relates to a polygon machining device and a polygon machining method.

BACKGROUND

Polygon machining in which the outer peripheral surface of a workpiece is machined into a polygon or the like by using a polygon cutter is conventional. Polygon machining is carried out by rotating a workpiece gripped by a main shaft about the shaft line and by synchronously rotating the polygon cutter mounted to a tool spindle in a predetermined rotation ratio with respect to the workpiece.

There is a polygon machining method in which polygon machining is carried out after matching the phase of a workpiece with that of the polygon cutter between each piece of the polygon machining in the case where a plurality of kinds of polygon machining is carried out on the outer peripheral surface of a workpiece (e.g., see Patent Document 1).

RELATED DOCUMENTS

[Patent Document 1] Japanese Patent No. 5080120

SUMMARY

Technical Problem

As described above, in the case where the polygon machining is carried out on the outer peripheral surface of a workpiece, first, it is necessary to carry out first polygon machining on the workpiece, then carry out deburring machining or the like to remove burrs generated on the outer peripheral surface of the workpiece in the first polygon machining on the workpiece on which the first polygon machining has been carried out, and to carry out second polygon machining to remove burrs generated on the inner peripheral surface of the workpiece in the first polygon machining on the workpiece on which the deburring machining or the like has been carried out after rotating the polygon cutter so that the position of the origin set on the rotary tool table and the polygon cutter are relatively in a predetermined arrangement relationship, and therefore there is a drawback in that the number of processes at the time of machining increases.

An object of the present invention is to provide a polygon machining device and a polygon machining method for carrying out a plurality of pieces of polygon machining on a workpiece gripped by a main shaft that rotates by using a polygon cutter mounted to a tool spindle that rotates in synchronization with the main shaft.

Solution to Problem

In order to implement the above-described object, according to the present invention, in a polygon machining device including a main shaft gripping a workpiece, a tool spindle to which a polygon cutter is mounted, and a control unit configured to control the rotation of the main shaft and the tool spindle, and being configured so as to carry out machining by a tool other than the polygon cutter on a workpiece after carrying out first polygon machining by the polygon cutter and to carry out second polygon machining by the polygon cutter after the machining, the control unit includes a synchronization stopping unit configured to stop the main shaft in a predetermined fixed rotation position in the state where the main shaft and the tool spindle are synchronously rotated at the time of the first polygon machining when the first polygon machining ends, a synchronization releasing unit configured to release the synchronization between the main shaft and the tool spindle when machining after the first polygon machining starts, a main shaft stopping unit configured to stop the main shaft in a fixed rotation position when machining after the first polygon machining ends, and a synchronization starting unit configured to synchronously rotate the main shaft and the tool spindle when the second polygon machining starts, and the control unit is configured so as to end the first polygon machining in the state where the synchronization stopping unit is in operation, to start machining after the first polygon machining by operating the synchronization releasing unit, to end machining after the first polygon machining in the state where the main shaft stopping unit is in operation, and to carry out the second polygon machining by operating the synchronization starting unit.

In the present invention, a polygon machining method for carrying out machining by a tool other than a polygon cutter on a workpiece gripped by a main shaft after carrying out first polygon machining by the polygon cutter mounted to a tool spindle and for carrying out second polygon machining by the polygon cutter after the machining includes a synchronization stopping step of stopping the main shaft in a predetermined fixed rotation position in the state where the main shaft and the tool spindle are synchronously rotated at the time of the polygon machining when the first polygon machining ends, a synchronization releasing step of releasing the synchronization between the main shaft and the tool spindle when machining after the first polygon machining starts, a main shaft stopping step of stopping the main shaft in a fixed rotation position when machining after the first polygon machining ends; and a synchronization starting step of synchronously rotating the main shaft and the tool spindle when the second polygon machining starts, and the polygon machining method is configured so as to end the first polygon machining in the state where the synchronization stopping step is in operation, to start machining after the first polygon machining by operating the synchronization releasing step, to end machining after the first polygon machining in the state where the main shaft stopping step is in operation, and to carry out the second polygon machining by operating the synchronization starting step.

Advantageous Effects of Invention

According to the present invention, it is possible to implement a polygon machining device and a polygon machining method for carrying out polygon machining on a workpiece gripped by a main shaft that rotates by using a polygon cutter mounted to a tool spindle that rotates in synchronization with the main shaft. According to the present invention, in the case where two kinds of polygon machining are carried out on the outer peripheral surface of a workpiece, it is possible to easily match the phase of the workpiece with the phase of the polygon cutter at both points in time, and therefore it is possible to accurately form a plurality of polygonal shapes in a predetermined phase relationship on the outer peripheral surface of the workpiece.

BRIEF DESCRIPTION OF THE DRAWINGS

FIG. 2A is a partial cutout side view and FIG. 2B is a partial cutout front view;

FIG. 4 is a flowchart showing an operation flow of the polygon machining method according to the embodiment of the present invention; and FIGS. 5A to 5D are diagrams explaining an example in which two kinds of polygon machining are carried out by the polygon machining method according to the embodiment of the present invention.

DESCRIPTION OF EMBODIMENTS

Figure 1:
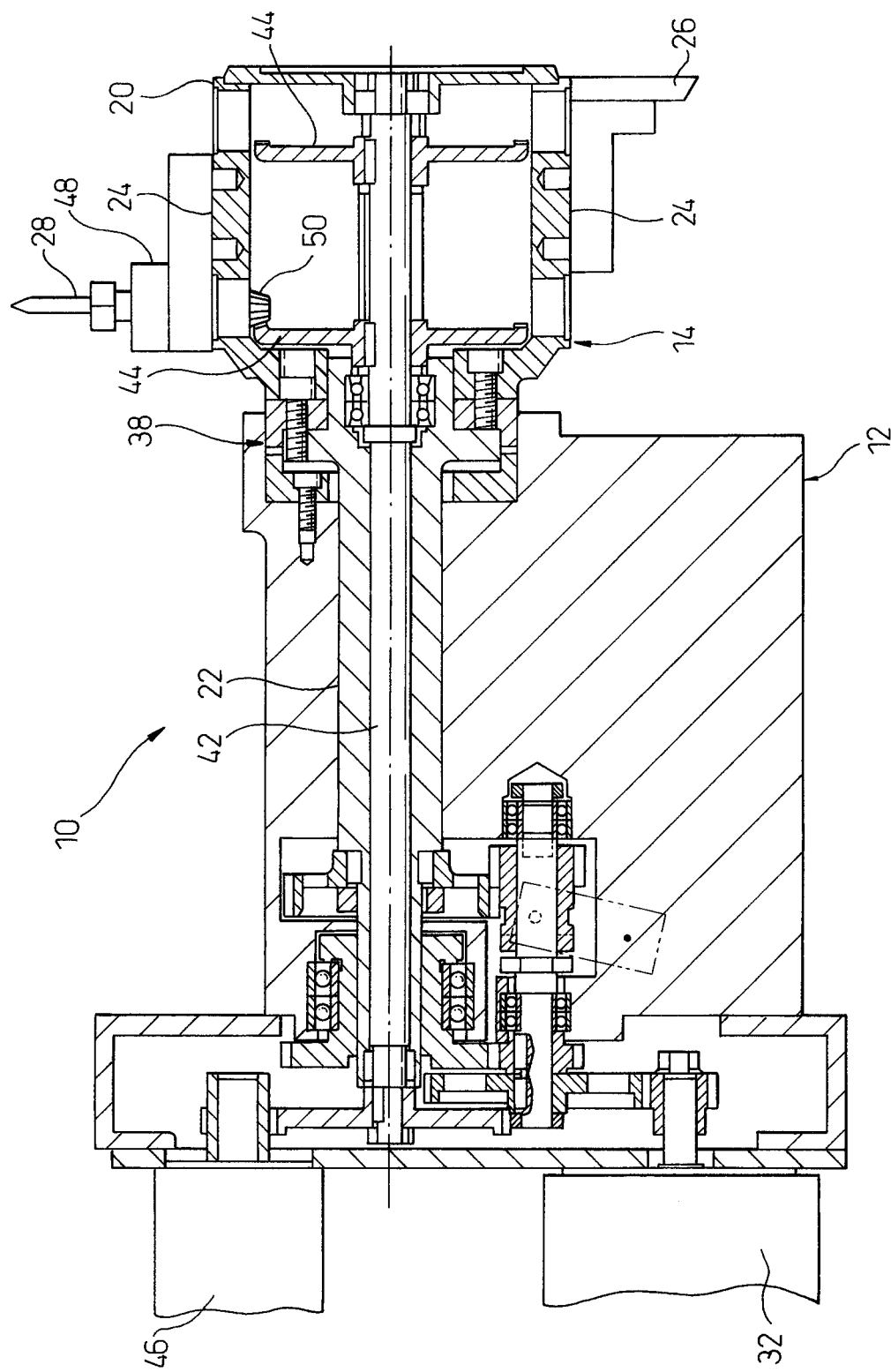
FIG. 1 is a section view illustrating an example of a configuration of a turret cutter holder that is mounted on a machine tool to which a polygon machining device according to the present invention can be applied.
Figure 2A:
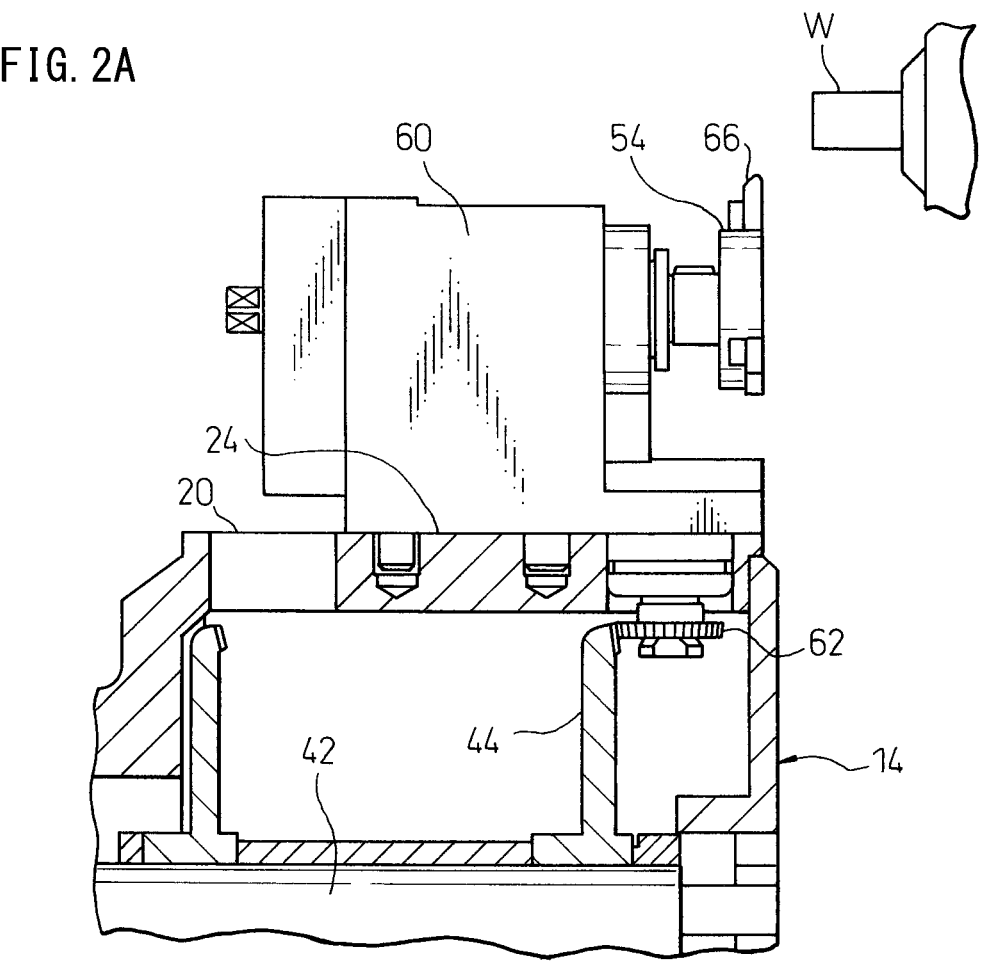
FIGS. 2A and 2B are diagrams illustrating a state where a polygon cutter that is used in the polygon machining device according to an embodiment of the present invention is mounted to the turret cutter holder illustrated in FIG. 3.
Figure 2B:
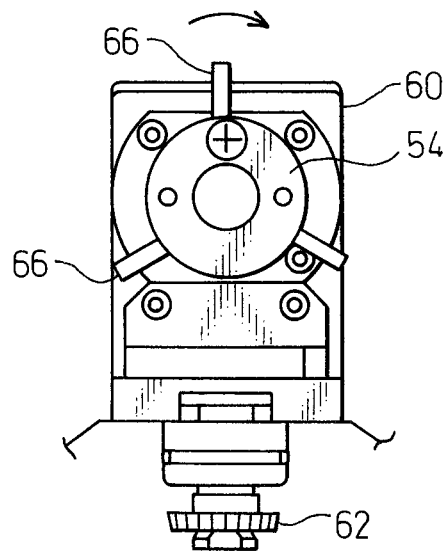
Figure 3:
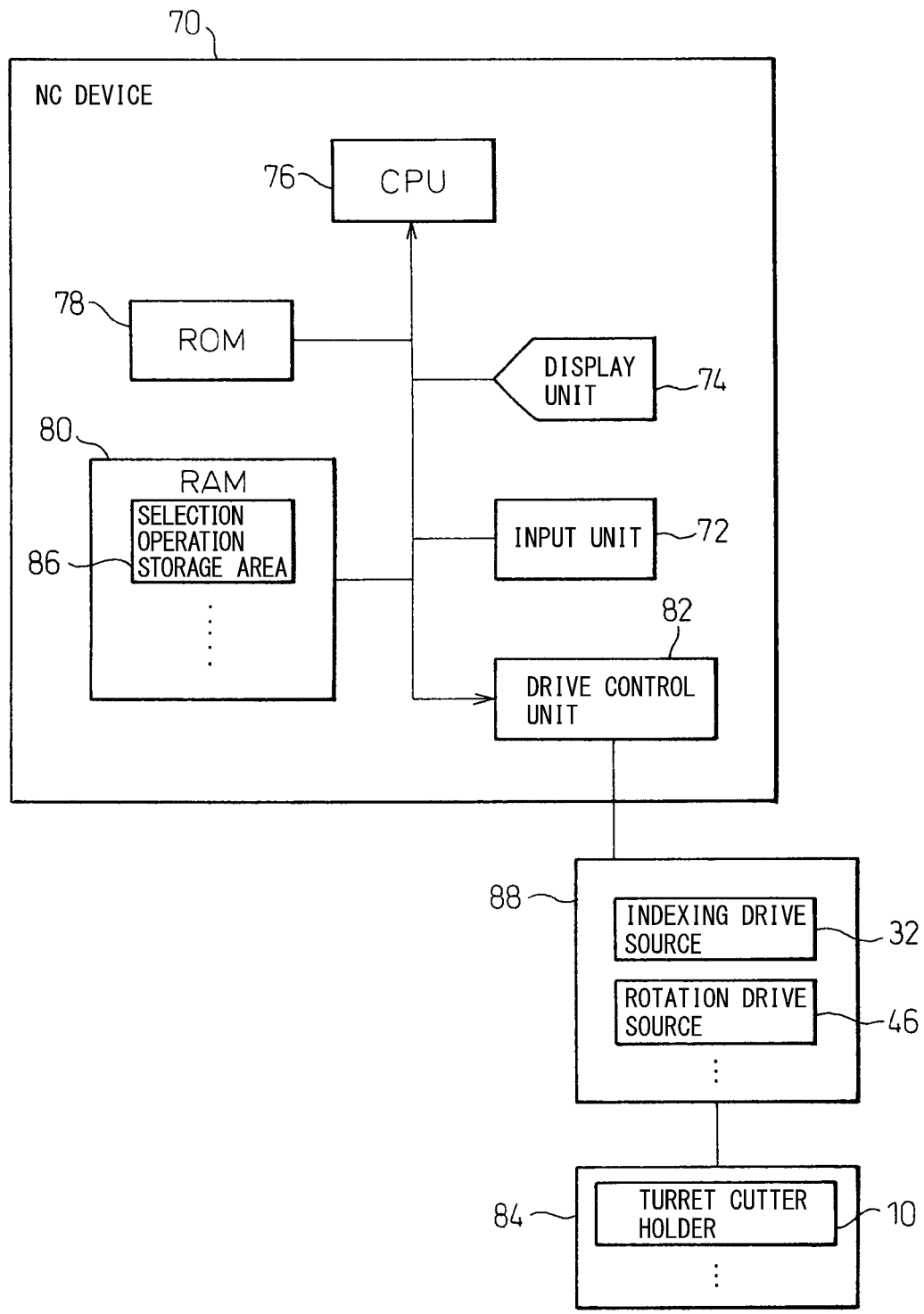
FIG. 3 is a block diagram illustrating a control unit capable of carrying out the polygon machining method according to the embodiment of the present invention.

FIG. 1 is a section view illustrating an example of a configuration of a turret cutter holder that is mounted on a machine tool to which a polygon machining device according to the present invention can be applied. FIGS. 2A and 2B are diagrams illustrating a state where a polygon cutter that is used in the polygon machining device according to an embodiment of the present invention is mounted to the turret cutter holder illustrated in FIG. 3, and FIG. 2A is a partial cutout side view and FIG. 2B is a partial cutout front view. A turret cutter holder 10 is mounted on an automatic lathe, such as an NC lathe, which is a machine tool. The turret cutter holder 10 includes a cutter table main body 12 and a turret 14 that is supported revolvably by the cutter table main body 12.

The turret 14 has a hollow head part 20 having an outline in the shape of a column or prism and a shaft part 22 in the shape of a hollow cylinder extended concentrically in the shaft line direction from one end in the shaft line direction of the head part 20. On the outer peripheral surface of the head part 20 of the turret 14, a plurality of tool mount parts 24 to which a tool is mounted is provided for each predetermined indexed angle. It is possible to selectively mount a machining tool, such as a cutting tool 26, and a rotary tool 28, such as a drill and a milling cutter, to each tool mount part 24. The shaft part 22 is supported by the cutter table main body 12 rotatably and movably in the shaft line direction.

The turret 14 is engaged with the cutter table main body 12 so as to be capable of being disengaged therefrom via an engagement part 38, and by disengaging the engagement part 38 by a servomotor 32 and by rotationally driving the shaft part 22, the turret 14 is driven revolvably. The turret 14 is fixed in the indexed position on the cutter table main body 12, and therefore it is possible to select a predetermined machining tool, by causing the engagement part 38 to engage in a predetermined revolving position of the turret 14.

Within the shaft part 22, a drive shaft 42 that is driven rotationally by a servomotor 46 is supported pivotally. When the rotary tool 28 is mounted to the desired tool mount part 24 of the turret 14 via a holder 48 including the tool spindle, a driven gear 50 that is linked to the tool spindle engages with a drive gear 44 attached to the drive shaft 42 and the rotary tool 28 is driven rotationally by the servomotor 46.

To the predetermined tool mount part 24, as illustrated in FIG. 2, it is possible to mount a polygon cutter 54 via a holder 60 including the tool spindle. When the polygon cutter 54 is mounted to the tool spindle of the holder 60 and a driven gear 62 that is linked to the polygon cutter 54 (tool spindle) via the power transmission within the holder 60 engages with the drive gear 44, the polygon cutter 54 is driven rotationally by the servomotor 46.

It is possible to form an ellipse, a polygon, etc., on the outer peripheral surface of a workpiece W by carrying out polygon machining on the workpiece W gripped by the main shaft, by revolving the turret 14 to select the polygon cutter 54 and by synchronously rotating the main shaft that is driven rotationally by the main shaft motor and the polygon cutter 54 to maintain the phase relationship between the main shaft and the polygon cutter 54. In the polygon machining, the tool spindle and the main shaft are driven rotationally so that the rotation speed of the workpiece W and the rotation speed of the polygon cutter 54 form a predetermined ratio. For example, in the case where a quadrangle is formed on the outer peripheral surface of the workpiece, it is possible to machine the quadrangle by rotating the polygon cutter in which two cutters, the number of cutters being half the number of angles of the quadrangle, are arranged twice while rotating the workpiece once. Further, for example, in the case where a hexagon is formed on the outer peripheral surface of the workpiece, it is sufficient to rotate the polygon cutter in which three cutters, the number of cutters being half the number of angles of the hexagon, are arranged so as to form, for example, a triangle three times while rotating the workpiece once.

It is possible to carry out general cutting machining of the workpiece W with the shaft line of the main shaft as a center, by revolving the turret 14 to select the cutting tool 26. For example, there is outer diameter machining of a workpiece using an outer diameter cutting tool or deburring machining to remove burrs generated on the outer peripheral surface of a workpiece. In the cutting machining, the polygon cutter 54 is not used, and therefore the synchronization between the main shaft and the tool spindle is not required and it is possible to set the rotation speed of the main shaft to a speed higher than that at the time of the polygon machining in an attempt to reduce the time taken by the workpiece machining. Normally, the maximum rotation speed of the tool spindle is set lower than the maximum rotation speed of the main shaft, and therefore in the case where the main shaft and the tool spindle are in synchronization, the maximum rotation speed of the main shaft is restricted by the maximum rotation speed of the tool spindle as a result. Thus, in the case of the above-described cutting machining, the synchronization between the main shaft and the tool spindle is released and the main shaft is driven rotationally at a rotation speed necessary for the cutting machining independently of the tool spindle.

FIG. 3 is a block diagram illustrating a control unit capable of carrying out the polygon machining method according to the embodiment of the present invention. The drive of the tool spindle and the main shaft is controlled by the control unit illustrated in FIG. 3. The control unit includes an NC device 70 mounted on a numerical control (NC) lathe in the present embodiment. However, it is also possible to use another control device different from the NC device.

The NC device 70 includes an input unit 72, a display unit 74, a processing unit (CPU) 76, a storage unit (ROM 78 and RAM 80), a drive control unit 82, etc.

In the control device (NC device 70), the CPU 76 outputs an operation command to the drive control unit 82 based on various kinds of data, machining programs, etc., stored in the ROM 78 or the RAM 80, and the control unit 82 controls the indexing drive source (servomotor) 32 and the rotation drive source (servomotor) 46 of the turret cutter holder 10 and, a drive mechanism 88, such as a main shaft motor that drives the main shaft rotationally, respectively, and causes the turret 14 to revolve and the rotary tool 28 (tool spindle) and the main shaft to rotate. The control device is configured so as to be capable of switching between the synchronous drive and the asynchronous drive of the servomotor 46 (rotational drive of the rotary tool 28) and the main shaft motor (rotational drive of the main shaft).

FIG. 4 is a flowchart showing an operation flow of the polygon machining method according to the embodiment of the present invention.

First, at step S101, first polygon machining is carried out by the polygon cutter 54 by synchronously rotating the main shaft gripping the workpiece W and the tool spindle to which the polygon cutter 54 is mounted.

After the first polygon machining, at step S102, the main shaft is stopped in a predetermined fixed point position while maintaining the synchronization between the main shaft and the tool spindle (i.e., phase relationship). The main shaft and the tool spindle are in synchronization, and therefore when the main shaft (workpiece) stops, the tool spindle (polygon cutter 54) also stops. As the fixed point position, the origin of the main shaft (position where the rotation angle of the main shaft is 0 degrees) or the like can be thought.

Next, at step S103, the synchronization between the main shaft and the tool spindle is released and the main shaft is caused to rotate alone and the cutting machining is carried out on the workpiece gripped by the main shaft. At the time of the cutting machining at step S103, the polygon cutter 54 is retracted in advance.

After the cutting machining, at step S104, the main shaft is stopped in the above-described fixed point position and the polygon cutter 54 in the retracted state is indexed. As a result, the phase relationship between the main shaft and the tool spindle becomes the same as that at step S101. The turret 14 is configured so that the phase of the tool spindle becomes the same before the retraction and after the indexing when the polygon cutter 54 temporarily retracts after stopping at step S102 and is indexed again.

The phase relationship between the main shaft and the tool spindle becomes the same as that at step S101, by the main shaft stopping in the above-described predetermined fixed point position, and therefore after step S104, second polygon machining is carried out by the polygon cutter 54 at step S105.

As described above, the workpiece machining method according to the embodiment of the present invention includes: a synchronization stopping step (step S102) of stopping the main shaft in a predetermined fixed rotation position in the state where the main shaft and the tool spindle are synchronously rotated at the time of polygon machining when the first polygon machining (step S101) ends; a synchronization releasing step of releasing the synchronization between the main shaft and the tool spindle when the cutting machining (step S103) starts; a main shaft stopping step (step S104) of stopping the main shaft in a fixed rotation position when the cutting machining (step S103) ends; and a synchronization starting step of synchronously rotating the main shaft and the tool spindle when the second polygon machining (step S105) starts. The workpiece machining method is configured so as to end the first polygon machining (step S101) in the state where the synchronization stopping step is in operation, to start the cutting machining (step S103) by operating the synchronization stopping step, to end the cutting machining (step S103) in the state where the main shaft stopping step is in operation, and to carry out the second polygon machining (step S105) by operating the synchronization starting step.

The polygon machining device that carrying out each piece of the above-described processing includes the main shaft gripping a workpiece, the tool spindle to which a polygon cutter is mounted, and the control unit configured to control the rotation of the main shaft and the tool spindle. The control unit includes: a synchronization stopping unit configured to stop the main shaft in a predetermined fixed rotation position in the state where the main shaft and the tool spindle are synchronously rotated at the time of the first polygon machining when the first polygon machining (step S101) ends; a synchronization releasing unit configured to release the synchronization between the main shaft and the tool spindle when the cutting machining (step S103) starts; a main shaft stopping unit configured to stop the main shaft in a fixed rotation position when the cutting machining (step S103) ends; and a synchronization starting unit configured to synchronously rotate the main shaft and the tool spindle when the second polygon machining (step S105) starts, and controls the rotation of the main shaft and the tool spindle so that the first polygon machining (step S101) is ended in the state where the synchronization stopping unit is in operation, the cutting machining (step S103) is started by operating the synchronization releasing unit, the cutting machining (step S103) is ended in the state where the main shaft stopping unit is in operation, and the second polygon machining (step S105) is carried out by operating the synchronization starting unit.

FIGS. 5A to 5D are diagrams explaining an example in which two kinds of polygon machining are carried out on the workpiece W gripped by the main shaft by using the polygon cutter 54 linked to the tool spindle and including three cutters 66 by the polygon machining method according to the embodiment of the present invention. The case is explained where two hexagons different in size are formed in the same phase on the outer peripheral surface of the workpiece W as illustrated in FIG. 5A.

First, at step S201, an outer diameter cutting tool 57 is indexed and the workpiece W gripped by the main shaft is guided by a guide bush 55, and outer diameter machining (cutting machining) is carried out on the workpiece W. Next, at step S202, the polygon cutter 54 is indexed and the first polygon machining to form a hexagon is carried out on the portion of the workpiece W on which the outer diameter machining has been carried out as illustrated at step S203. After the polygon machining at step S203, the main shaft is stopped in the position of the main shaft origin (fixed point) while maintaining the synchronization (phase relationship) between the main shaft and the tool spindle. Next, at step S204, the outer diameter cutting tool 57 is indexed, the synchronization between the main shaft and the tool spindle is released, the main shaft is caused to rotate alone independently of the tool spindle, and the outer diameter machining is carried out on the workpiece W. After the cutting machining, the main shaft is stopped in the main shaft origin. Then, the polygon cutter 54 is indexed as illustrated at step S205 and the second polygon machining to form a hexagon on the workpiece W is carried out. At the time of carrying out the first polygon machining and at the time of carrying out the second polygon machining, the phase of the polygon cutter 54 is the same as the phase of the workpiece W, and therefore it is possible to carry out the second polygon machining in the predetermined phase (in the present embodiment, in the same phase) with respect to the first polygon machining. Even in the case where cutting machining in which the phase of the polygon cutter 54 (tool spindle) and the phase of the workpiece W (main shaft) are not related is carried out between the first polygon machining and the second polygon machining, it is possible to easily carry out the polygon machining, which requires matching of the phase relationship therebetween, on the outer peripheral surface of the workpiece W only by stopping the main shaft in a predetermined fixed point position, such as the main shaft origin.

CITATION LIST 10 turret cutter holder
12 cutter table main body
14 turret
20 head part
22 shaft part
24 tool mount parts
26 cutting tool
28 rotary tool
32 servomotor
38 engagement part
42 drive shaft
44 drive gear
46 servomotor
48 holder
50 driven gear
54 polygon cutter
55 guide bush
57 outer diameter cutting tool
60 holder
62 driven gear
66 cutters
70 NC device
72 input unit
74 display unit
76 CPU
78 ROM
80 RAM
82 drive control unit
84 movable structure
86 drive mechanism
W workpiece

What is claimed is:

1. A polygon machining device comprising a main shaft gripping a workpiece, a tool spindle to which a polygon cutter is mounted, and a control unit configured to control the rotation of the main shaft and the tool spindle, and being configured so as to carry out machining by a tool other than the polygon cutter on the workpiece after carrying out first polygon machining by the polygon cutter and carry out second polygon machining by the polygon cutter after the machining, wherein the control unit includes:
a synchronization stopping unit configured to stop the main shaft in a predetermined fixed rotation position in a state where the main shaft and the tool spindle are synchronously rotated at the time of the first polygon machining when the first polygon machining ends;
a synchronization releasing unit configured to release synchronization between the main shaft and the tool spindle when the machining after the first polygon machining starts;
a main shaft stopping unit configured to stop the main shaft in the fixed rotation position when the machining after the first polygon machining ends; and
a synchronization starting unit configured to synchronously rotate the main shaft and the tool spindle when the second polygon machining starts, and
the control unit is configured so as to end the first polygon machining in the state where the synchronization stopping unit is in operation, to start the machining by operating the synchronization releasing unit, to perform the machining after the first polygon machining in a phase unrelated to phases of the first and second polygon machining, to end the machining after the first polygon machining in the state where the main shaft stopping unit is in operation, and to carry out the second polygon machining in a predetermined phase with respect to the first polygon machining by operating the synchronization starting unit.

2. A polygon machining method for carrying out machining by a tool other than a polygon cutter on a workpiece gripped by a main shaft after carrying out first polygon machining by the polygon cutter that is mounted to a tool spindle and for carry outing second polygon machining by the polygon cutter after the machining, the method comprising:
a synchronization stopping step of stopping the main shaft in a predetermined fixed rotation position in a state where the main shaft and the tool spindle are synchronously rotated at the time of the first polygon machining when the first polygon machining ends;
a synchronization releasing step of releasing synchronization between the main shaft and the tool spindle when the machining after the first polygon machining starts;
a main shaft stopping step of stopping the main shaft in the fixed rotation position when the machining after the first polygon machining ends; and
a synchronization starting step of synchronously rotating the main shaft and the tool spindle when the second polygon machining starts,
wherein the polygon machining method is configured so as to end the first polygon machining in a state where the synchronization stopping step is in operation, to start the machining by operating the synchronization releasing step, to perform the machining after the first polygon machining in a phase unrelated to phases of the first and second polygon machining, to end the machining after the first polygon machining in a state where the main shaft stopping step is in operation, and to carry out the second polygon machining in a predetermined phase with respect to the first polygon machining by operating the synchronization starting step.

* * * * *